US012700138B2

(12) United States Patent
Ren

(10) Patent No.: US 12,700,138 B2
(45) Date of Patent: *Aug. 4, 2026

(54) METHOD AND APPARATUS FOR CALIBRATING EXTRINSIC PARAMETER OF A CAMERA

(71) Applicant: Yinwang Intelligent Technologies Co., Ltd., Shenzhen (CN)

(72) Inventor: Xiaorong Ren, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 424 days.

This patent is subject to a terminal disclaimer.

(21) Appl. No.: 18/177,930

(22) Filed: Mar. 3, 2023

(65) Prior Publication Data

US 2023/0206500 A1     Jun. 29, 2023

Related U.S. Application Data

(63) Continuation of application No. PCT/CN2021/114890, filed on Aug. 27, 2021.

(30) Foreign Application Priority Data

Sep. 4, 2020   (CN) .......................... 202010919175.8

(51) Int. Cl.
*G06T 7/80* (2017.01)
*G06T 7/00* (2017.01)
*G06V 20/56* (2022.01)

(52) U.S. Cl.
CPC .................. *G06T 7/80* (2017.01); *G06T 7/97* (2017.01); *G06V 20/588* (2022.01)

(58) Field of Classification Search
None
See application file for complete search history.

(56) References Cited

U.S. PATENT DOCUMENTS

2018/0188041 A1* 7/2018 Chen .................. G01C 21/3848
2018/0322658 A1* 11/2018 Wang .................. H04N 13/246
(Continued)

FOREIGN PATENT DOCUMENTS

CN      101617943 A    1/2010
CN      109214980 A    1/2019
(Continued)

OTHER PUBLICATIONS

Hu, Z., & Uchimura, K. (2004). Solution of Camera Registration Problem Via 3D-2D Parameterized Model Matching for On-Road Navigation. International Journal of Image and Graphics, 04(01), 3-20.*

(Continued)

*Primary Examiner* — Andrew W Bee
*Assistant Examiner* — Christine Zhao
(74) *Attorney, Agent, or Firm* — Leydig, Voit & Mayer, Ltd.

(57)     ABSTRACT

This disclosure relates to the field of artificial intelligence, and in particular, to the field of autonomous driving, and provides a method and apparatus for calibrating an extrinsic parameter of a camera. The method includes: obtaining a photographed image photographed by the camera, the photographed image being an image photographed by the camera using a calibration reference object as a photographed object; and obtaining extrinsic parameters of the camera based on the photographed image and a high-precision map, the high-precision map including the calibration reference object. The extrinsic parameters of the camera are obtained using the photographed image of the calibration reference object that is photographed by the camera and the high-precision map, so that calibration precision of the extrinsic parameters of the camera can be improved. This disclosure
(Continued)

100

S110: Obtain a photographed image photographed by a camera, where the photographed image is an image photographed by the camera using a calibration reference object as a photographed object S120: Obtain extrinsic parameters of the camera based on the photographed image and a high-precision map, where the high-precision map includes the calibration reference object may be applied to an intelligent vehicle, a connected vehicle, a new energy vehicle, or an autonomous vehicle.

12 Claims, 4 Drawing Sheets

(56)     References Cited

U.S. PATENT DOCUMENTS

| 2020/0143710 | A1 * | 5/2020 | Zhou | ............... | G05D 1/0246 |
| 2020/0380305 | A1 * | 12/2020 | Sharma | ............... | G06V 20/56 |
| 2021/0407130 | A1 * | 12/2021 | Qian | ............... | G06V 30/1918 |
| 2022/0222857 | A1 * | 7/2022 | Yuan | ............... | G06T 7/80 |

FOREIGN PATENT DOCUMENTS

| CN | 110148164 | A | | 8/2019 | |
| CN | 110728720 | A | | 1/2020 | |
| CN | 110751693 | A | | 2/2020 | |
| CN | 111061820 | A | * | 4/2020 | |
| CN | 111340890 | A | * | 6/2020 | ............... G06T 7/80 |
| CN | 082020 | | * | 8/2020 | ............... G06T 7/80 |
| EP | 3633620 | A1 | | 4/2020 | |
| WO | 2019221349 | A1 | | 11/2019 | |

OTHER PUBLICATIONS

Hooke, R., & Jeeves, T. (1961). "Direct Search" Solution of Numerical and Statistical Problems. J. ACM, 8(2), 212-229.*
Hu et al., "solution of Camera Registration Problem via 3D-2D Parameterized Model Matching for On-Road Navigation", Internatinal Journal of Image and Graphics, vol. 4, No. 1(2004) 1-18, total 18 pages.

* cited by examiner

Figures 1, 2:
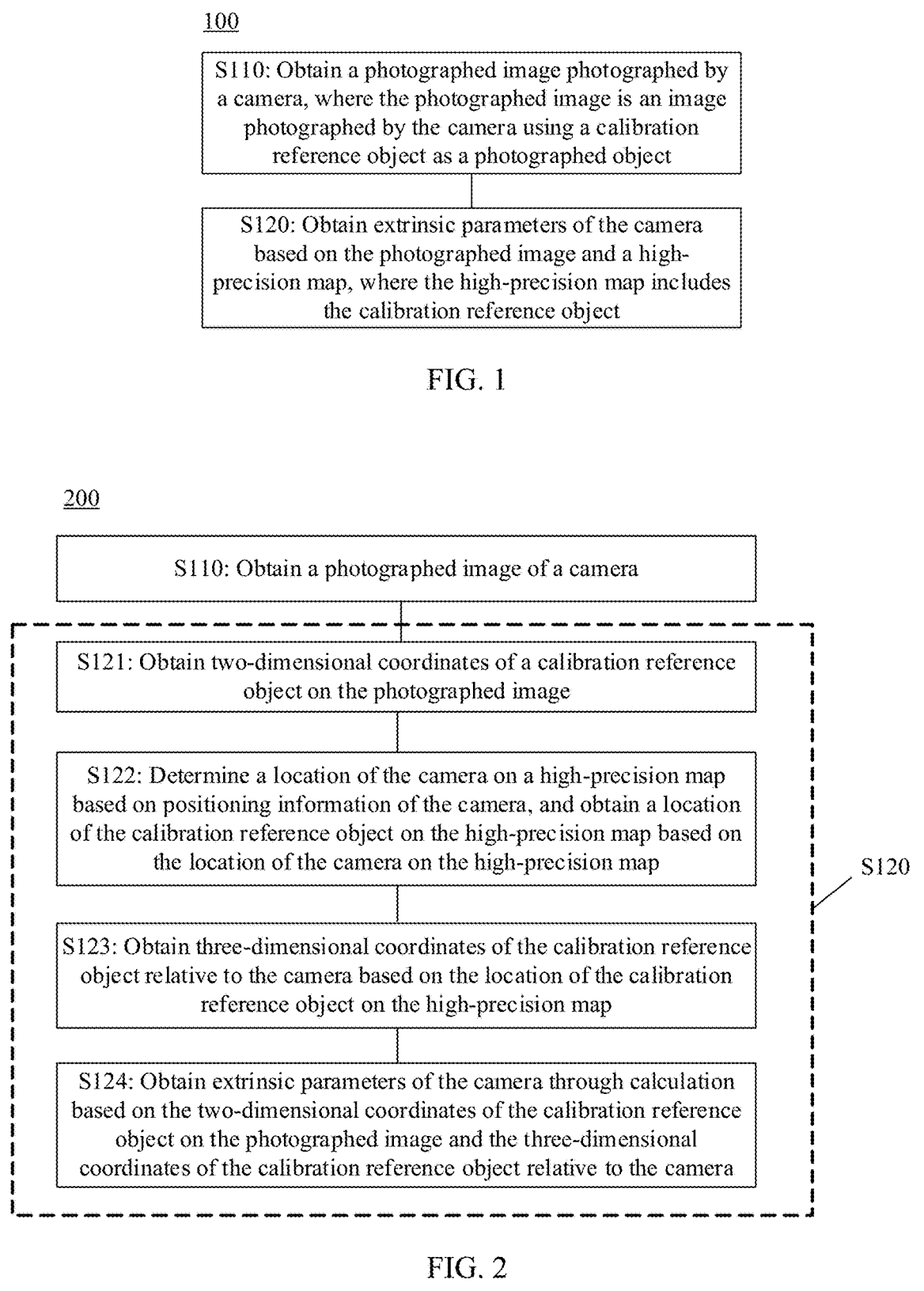

100

> S110: Obtain a photographed image photographed by a camera, where the photographed image is an image photographed by the camera using a calibration reference object as a photographed object > S120: Obtain extrinsic parameters of the camera based on the photographed image and a high-precision map, where the high-precision map includes the calibration reference object

> S110: Obtain a photographed image of a camera

> S121: Obtain two-dimensional coordinates of a calibration reference object on the photographed image > S122: Determine a location of the camera on a high-precision map based on positioning information of the camera, and obtain a location of the calibration reference object on the high-precision map based on the location of the camera on the high-precision map > S123: Obtain three-dimensional coordinates of the calibration reference object relative to the camera based on the location of the calibration reference object on the high-precision map > S124: Obtain extrinsic parameters of the camera through calculation based on the two-dimensional coordinates of the calibration reference object on the photographed image and the three-dimensional coordinates of the calibration reference object relative to the camera

METHOD AND APPARATUS FOR CALIBRATING EXTRINSIC PARAMETER OF A CAMERA

CROSS-REFERENCE TO RELATED DISCLOSURES

This application is a continuation of International Application No. PCT/CN2021/114890, filed on Aug. 27, 2021, which claims priority to Chinese Patent Application No. 202010919175.8, filed on Sep. 4, 2020. The disclosures of the aforementioned applications are hereby incorporated by reference in their entireties.

TECHNICAL FIELD

This disclosure relates to the field of data processing, and in particular, to a method and apparatus for calibrating an extrinsic parameter of a camera.

BACKGROUND

Camera calibration is a process of obtaining camera parameters. The camera parameters include intrinsic parameters and extrinsic parameters. The intrinsic parameters are parameters of the camera, and the extrinsic parameters are parameters related to an installation position of the camera, for example, a pitch angle, a rotation angle, and a yaw angle.

Currently, camera calibration is classified into two categories: a conventional camera calibration method and a camera self-calibration method. The conventional camera calibration method uses a calibration board for calibration, but is applicable to only scenarios in which the camera is still. In an in-vehicle camera system, a vehicle may vibrate due to road conditions, causing changes of extrinsic parameters of a camera. Therefore, the camera parameters need to be dynamically calibrated. An existing dynamic camera calibration method is the camera self-calibration method in which calibration is performed by using a lane line. However, this method requires a vehicle to travel in the center, and is applicable to only scenarios under specific conditions. Consequently, calibration precision of extrinsic parameter is relatively low. In addition, this method is applicable to only specific roads, for example, a horizontal road and a straight road.

Therefore, precision of dynamic camera calibration, especially dynamic calibration precision of extrinsic parameters of a camera, needs to be improved.

SUMMARY

This disclosure provides a method and apparatus for calibrating an extrinsic parameter of a camera. By calibrating extrinsic parameters of a camera by using a high-precision map, calibration precision of the extrinsic parameters of the camera can be improved.

According to a first aspect, a method for calibrating an extrinsic parameter of a camera is provided. The method includes: obtaining a photographed image of a camera, where the photographed image is an image photographed by the camera by using a calibration reference object as a photographed object; and obtaining extrinsic parameters of the camera based on the photographed image and a high-precision map, where the high-precision map includes the calibration reference object.

The high-precision map includes the calibration reference object, which indicates that the high-precision map has location information of the calibration reference object.

The extrinsic parameters of the camera are obtained by using an actual photographed image of the calibration reference object and the high-precision map, so that in a process of obtaining the extrinsic parameters, an operation of measuring three-dimensional coordinates of the calibration reference object relative to the camera does not need to be performed.

In an existing dynamic camera calibration method, the three-dimensional coordinates of the calibration reference object relative to the camera are obtained through measurement. However, during movement of the camera, precision of measuring the three-dimensional coordinates of the calibration reference object relative to the camera is relatively low. As a result, calibration precision of extrinsic parameter of the camera is relatively low.

In this disclosure, the extrinsic parameters of the camera are obtained by using the photographed image of the calibration reference object and the high-precision map, and the operation of measuring three-dimensional coordinates of the calibration reference object relative to the camera does not need to be performed, so that the calibration precision of extrinsic parameter of the camera is no longer limited by measurement precision. Therefore, the calibration precision of extrinsic parameter of the camera can be improved.

The calibration reference object may be an object around the camera. For example, the calibration reference object may be a road feature object. For example, the calibration reference object may be any one of the following road feature objects: a lane line, a sign plate, a pole-like object, a pavement marking, and a traffic light. The sign plate is, for example, a traffic sign or a pole-like sign, and the pole-like object is, for example, a street lamp pole.

With reference to the first aspect, in an implementation, the obtaining extrinsic parameters of the camera based on the photographed image and a high-precision map includes: obtaining two-dimensional coordinates of the calibration reference object on the photographed image; determining a location of the camera on the high-precision map based on positioning information of the camera, and obtaining a location of the calibration reference object on the high-precision map based on the location of the camera on the high-precision map; obtaining three-dimensional coordinates of the calibration reference object relative to the camera based on the location of the calibration reference object on the high-precision map; and obtaining the extrinsic parameters of the camera through calculation based on the two-dimensional coordinates and the three-dimensional coordinates.

Optionally, in an implementation, the obtaining three-dimensional coordinates of the calibration reference object relative to the camera based on the location of the calibration reference object on the high-precision map includes: obtaining an absolute location of the calibration reference object based on the location of the calibration reference object on the high-precision map; and obtaining the three-dimensional coordinates of the calibration reference object relative to the camera through calculation based on the absolute location of the calibration reference object and an absolute location of the camera.

Optionally, in another implementation, the high-precision map has a function of generating relative locations of two location points on the map. The obtaining three-dimensional coordinates of the calibration reference object relative to the camera based on the location of the calibration reference object on the high-precision map includes: generating the three-dimensional coordinates of the calibration reference object relative to the camera by using the high-precision map based on the location of the camera on the high-precision map and the location of the calibration reference object on the high-precision map.

The positioning information of the camera may be obtained by using any one or a combination of the following location technologies: a real-time kinematic (RTK) technology based on satellite location, and a matching location technology based on vision or a laser radar.

In an existing dynamic camera calibration method, the three-dimensional coordinates of the calibration reference object relative to the camera are obtained through measurement. As a result, the calibration precision of extrinsic parameter of the camera depends on measurement precision of the three-dimensional coordinates.

In this implementation, the three-dimensional coordinates of the calibration reference object relative to the camera are obtained by using the high-precision map, instead of being obtained through measurement, thereby avoiding that the calibration precision of extrinsic parameter of a camera is limited by measurement precision. In addition, because a high-precision attribute of the high-precision map can improve precision of the three-dimensional coordinates of the calibration reference object relative to the camera, thereby improving the calibration precision of extrinsic parameter of a camera.

With reference to the first aspect, in an implementation, the calibration reference object is a road feature object. The obtaining extrinsic parameters of the camera based on the photographed image and a high-precision map includes: obtaining a plurality of groups of camera parameters, where each group of camera parameters includes intrinsic parameters and extrinsic parameters; and generating a plurality of road feature projection images by using the high-precision map based on the plurality of groups of camera parameters and positioning information of the camera; obtaining, from the plurality of road feature projection images, a matched road feature projection image that has a highest degree of matching with the photographed image; and obtaining the extrinsic parameters of the camera based on one group of camera parameters corresponding to the matched road feature projection image.

Optionally, in an implementation, the obtaining a plurality of groups of camera parameters includes: generating, by using an initial value of a rotation matrix of the camera as a reference, a plurality of groups of rotation matrix simulated values by using a preset step; and generating the plurality of groups of camera parameters based on the plurality of groups of rotation matrix simulated values.

Optionally, in another implementation, the obtaining a plurality of groups of camera parameters includes: generating, by using a rotation matrix and a translation matrix of the camera separately as a reference, a plurality of groups of rotation matrix simulated values and a plurality of groups of translation matrix simulated values by using a corresponding step; and generating the plurality of groups of camera parameters based on the plurality of groups of rotation matrix simulated values and the plurality of groups of translation matrix simulated values.

It should be understood that, in an actual process of obtaining the plurality of groups of camera parameters, which types of parameters remain unchanged and which types of parameters change may be determined based on an application requirement.

Optionally, in some implementations, a form of the road feature object on the high-precision map is a binary image. The obtaining, from the plurality of road feature projection images, a matched road feature projection image that has a highest degree of matching with the photographed image includes: obtaining a binary image of the photographed image; and obtaining, from the plurality of road feature projection images, a matched road feature projection image that has a highest degree of matching with the binary image of the photographed image.

The photographed image, photographed by the camera, of the calibration reference object is processed into a binary image, so that a form of the photographed image is consistent with the form of the road feature object on the high-precision map. Even if the form of the photographed image is consistent with the form of the plurality of road feature projection images, this helps improve accuracy of image matching, so as to implement high calibration precision of extrinsic parameter.

In an existing dynamic camera calibration method, the three-dimensional coordinates of the calibration reference object relative to the camera are obtained through measurement. As a result, the calibration precision of extrinsic parameter of a camera depends on measurement precision of the three-dimensional coordinates.

In this embodiment, the extrinsic parameters of the camera are obtained by using a road feature object projection function of the high-precision map, instead of being obtained by measuring the three-dimensional coordinates of the calibration reference object relative to the camera, thereby avoiding that the calibration precision of extrinsic parameter of a camera is limited by measurement precision. In addition, due to a high-precision attribute of the high-precision map, high calibration precision of extrinsic parameter of a camera can be implemented.

Optionally, the camera is a vehicle-mounted camera, and a vehicle on which the camera is carried may be in a static state, or may be in a moving state.

According to a second aspect, an apparatus for calibrating an extrinsic parameter of a camera is provided, including: an obtaining unit, configured to obtain a photographed image of a camera, where the photographed image is an image photographed by the camera by using a calibration reference object as a photographed object; and a processing unit, configured to obtain extrinsic parameters of the camera based on the photographed image and a high-precision map, where the high-precision map includes the calibration reference object.

With reference to the second aspect, in an implementation, the processing unit is configured to obtain the extrinsic parameters of the camera by performing the following operations: obtaining two-dimensional coordinates of the calibration reference object on the photographed image; determining a location of the camera on the high-precision map based on positioning information of the camera, and obtaining a location of the calibration reference object on the high-precision map based on the location of the camera on the high-precision map; obtaining three-dimensional coordinates of the calibration reference object relative to the camera based on the location of the calibration reference object on the high-precision map; and obtaining the extrinsic parameters of the camera through calculation based on the two-dimensional coordinates and the three-dimensional coordinates.

Optionally, in an implementation, the processing unit obtains the three-dimensional coordinates of the calibration reference object relative to the camera by performing the following operations: obtaining an absolute location of the calibration reference object based on the location of the calibration reference object on the high-precision map; and obtaining the three-dimensional coordinates of the calibration reference object relative to the camera through calculation based on the absolute location of the calibration reference object and an absolute location of the camera.

Optionally, in another implementation, the high-precision map has a function of generating relative locations of two location points on the map. The processing unit obtains the three-dimensional coordinates of the calibration reference object relative to the camera by performing the following operation: generating the three-dimensional coordinates of the calibration reference object relative to the camera by using the high-precision map based on the location of the camera on the high-precision map and the location of the calibration reference object on the high-precision map.

With reference to the second aspect, in an implementation, the calibration reference object is a road feature object. The processing unit is configured to obtain the extrinsic parameters of the camera by performing the following operations: obtaining a plurality of groups of camera parameters, where each group of camera parameters includes intrinsic parameters and extrinsic parameters; and generating a plurality of road feature projection images by using the high-precision map based on the plurality of groups of camera parameters and positioning information of the camera; obtaining, from the plurality of road feature projection images, a matched road feature projection image that has a highest degree of matching with the photographed image; and obtaining the extrinsic parameters of the camera based on one group of camera parameters corresponding to the matched road feature projection image.

Optionally, in an implementation, the processing unit is configured to obtain the plurality of groups of camera parameters by performing the following operations: generating, by using an initial value of a rotation matrix of the camera as a reference, a plurality of groups of rotation matrix simulated values by using a preset step; and generating the plurality of groups of camera parameters based on the plurality of groups of rotation matrix simulated values.

Optionally, in another implementation, the processing unit is configured to obtain the plurality of groups of camera parameters by performing the following operations: generating, by using a rotation matrix and a translation matrix of the camera separately as a reference, a plurality of groups of rotation matrix simulated values and a plurality of groups of translation matrix simulated values by using a corresponding step; and generating the plurality of groups of camera parameters based on the plurality of groups of rotation matrix simulated values and the plurality of groups of translation matrix simulated values.

Optionally, in some implementations, if the form of the road feature object on the high-precision map is a binary image, the processing unit is configured to obtain the matched road feature projection image by performing the following operations: obtaining a binary image of the photographed image; and obtaining, from the plurality of road feature projection images, a matched road feature projection image that has a highest degree of matching with the binary image of the photographed image.

Optionally, the camera is a vehicle-mounted camera, and a vehicle on which the camera is carried may be in a static state, or may be in a moving state.

According to a third aspect, an apparatus for calibrating an extrinsic parameter of a camera is provided. The apparatus includes a processor, the processor is coupled to a memory, the memory is configured to store a computer program or instructions, and the processor is configured to execute the computer program or the instructions stored in the memory, so that the method in the first aspect is performed.

Optionally, the apparatus includes one or more processors.

Optionally, the apparatus may further include a memory coupled to the processor.

Optionally, the apparatus may include one or more memories.

Optionally, the memory may be integrated with the processor, or the memory and the processor are disposed separately.

Optionally, the apparatus may further include a data interface.

According to a fourth aspect, a computer-readable medium is provided. The computer-readable medium stores program code to be executed by a device, and the program code is used to perform the method in the first aspect.

According to a fifth aspect, a computer program product including instructions is provided. When the computer program product runs on a computer, the computer is enabled to perform the method in the first aspect.

According to a sixth aspect, a chip is provided. The chip includes a processor and a data interface. The processor reads, by using the data interface, instructions stored in a memory, to perform the method in the first aspect.

Optionally, in an implementation, the chip may further include a memory. The memory stores instructions. The processor is configured to execute the instructions stored in the memory. When the instructions are executed, the processor is configured to perform the method in the first aspect.

Based on the description above, it can be learned that in this disclosure, the extrinsic parameters of the camera are obtained by using the high-precision map and the photographed image of the calibration reference object, so that the precision of the extrinsic parameter calibration of a camera can be improved.

BRIEF DESCRIPTION OF DRAWINGS

FIG. 1 is a flowchart of a method for calibrating an extrinsic parameter of a camera according to an embodiment of this disclosure;

FIG. 2 is another flowchart of a method for calibrating an extrinsic parameter of a camera according to an embodiment of this disclosure;

DESCRIPTION OF EMBODIMENTS

Figure 3:
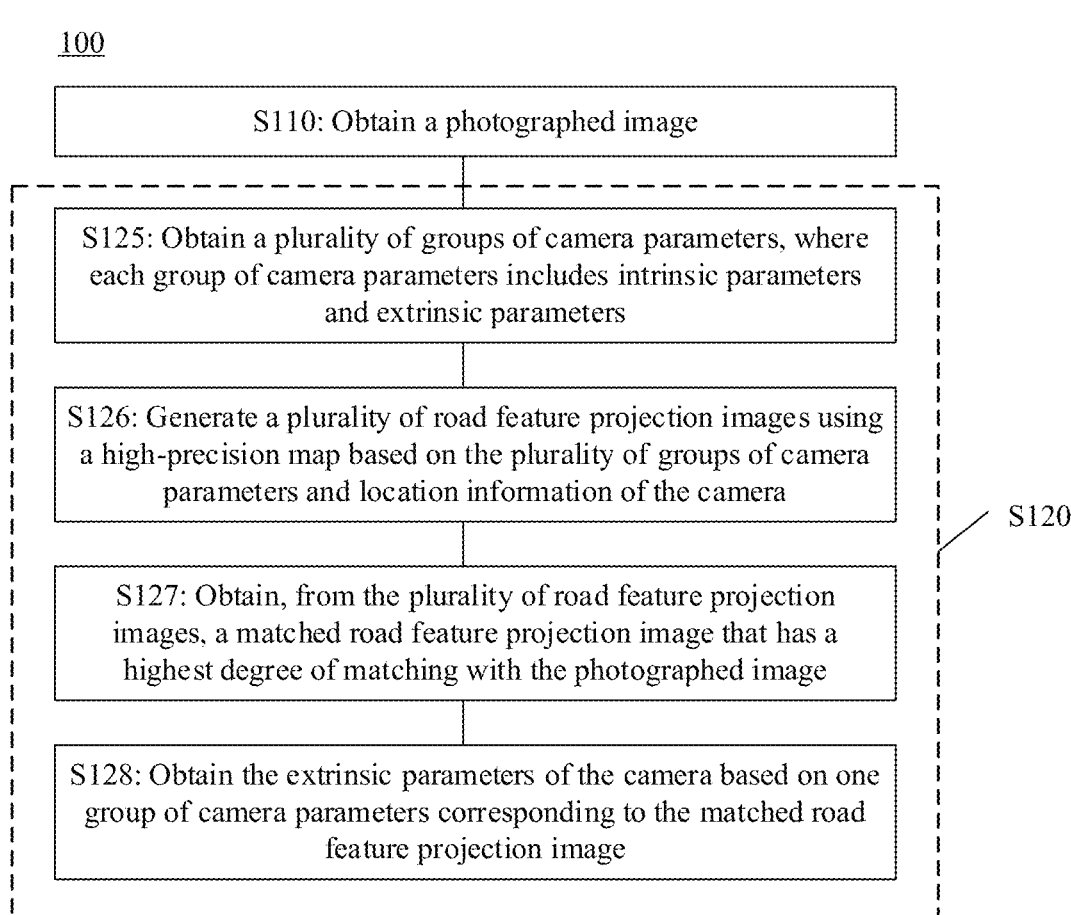
FIG. 3 is still another flowchart of a method for calibrating an extrinsic parameter of a camera according to an embodiment of this disclosure.

For ease of understanding embodiments of this disclosure, the following first describes several concepts in embodiments of this disclosure.

1. Camera Calibration (1) Definition of Camera Calibration

Based on a principle of camera imaging, it can be learned that there is a correspondence between a three-dimensional space point in a geometric model for camera imaging and a two-dimensional image point on an image plane, and the correspondence is determined by parameters of a camera. A process of obtaining the parameters of the camera is referred to as camera calibration. For the principle of camera imaging, refer to the conventional technology, and details are not described in this specification.

For example, it is assumed that a three-dimensional space point in a geometric model for camera imaging is denoted as $X_W$, and a two-dimensional image point on an image plane in the geometric model for camera imaging is denoted as $X_P$. A relationship between the three-dimensional space point $X_W$ and the two-dimensional image point $X_P$ may be expressed as follows:

$$X_P = MX_W \qquad (1)$$

M represents a conversion matrix between the three-dimensional space point $X_W$ and the two-dimensional image point $X_P$, and may be referred to as a projection matrix. Some elements in the projection matrix M represent parameters of the camera. The camera calibration is to obtain the projection matrix M.

The parameters of the camera include intrinsic parameters and extrinsic parameters. The intrinsic parameters are parameters of the camera, for example, a focal length. The extrinsic parameters are parameters related to an installation position of the camera, for example, a pitch angle, a rotation angle, and a yaw angle.

A conversion matrix corresponding to the intrinsic parameters may be referred to as an intrinsic parameter conversion matrix $M_1$, and a conversion matrix corresponding to extrinsic parameters may be referred to as an extrinsic parameter conversion matrix $M_2$. In the foregoing example, a relationship between the three-dimensional space point $X_W$ and the two-dimensional image point $X_P$ may also be expressed as:

$$X_P = M_1 M_2 X_W = MX_W \qquad (2)$$

Generally, a calibration reference object (also referred to as a calibration object or a reference object) is needed for camera calibration. The calibration reference object indicates an object photographed by the camera during camera calibration.

For example, in the foregoing example, the three-dimensional space point $X_W$ may be coordinates of the calibration reference object in a world coordinate system, and the two-dimensional image point $X_P$ may be two-dimensional coordinates of the calibration reference object on the image plane of the camera.

(2) Input and Output of Camera Calibration

Input of camera calibration: two-dimensional coordinates (that is, image point coordinates) of the calibration reference object on the image plane of the camera, and three-dimensional coordinates (that is, three-dimensional space coordinates) of the calibration reference object relative to the camera.

For example, the two-dimensional coordinates of the calibration reference object on the image plane of the camera may correspond to the two-dimensional image point $X_P$ in the foregoing example; and the three-dimensional coordinates of the calibration reference object relative to the camera may correspond to the three-dimensional space point $X_W$ in the foregoing example, or rigid transformation of the three-dimensional space point $X_W$.

Output of camera calibration: camera parameters including intrinsic parameters and extrinsic parameters.

The camera calibration is a crucial step in image measurement or machine vision applications. Precision of the calibration result directly affects accuracy of a result generated by the camera.

In a broad sense, the camera calibration may be classified into two categories: a conventional camera calibration method (static) and a camera self-calibration method (dynamic).

(3) Traditional Camera Calibration Method (Static)

A conventional camera calibration method is a static camera calibration method. In an environment in which a camera is in a static state, a calibration board (that is, a calibration reference object) is used to obtain an input of the camera calibration, so as to calculate intrinsic parameters and extrinsic parameters of the camera. Two-dimensional coordinates of the calibration reference object on the camera image plane are obtained by using an imaging result of the calibration board in different directions of the camera, and three-dimensional coordinates of the calibration reference object relative to the camera are obtained by measuring the calibration board.

A disadvantage of a conventional camera calibration method is that the method may only be applicable to an environment in which a camera is in a static state, and has a relatively high requirement on a placement position of the calibration board. A calibration process is complex and inefficient, and is difficult to implement in many application scenarios. For example, in an in-vehicle camera system, a vehicle vibrates during traveling due to road conditions, and consequently, the extrinsic parameters of the camera changes. In this case, if real-time calibration is not performed on the camera, accuracy of a subsequent operation of the in-vehicle camera system is further affected.

(4) Camera Self-Calibration Method (Dynamic)

The camera self-calibration method is a dynamic camera calibration method which does not need to be performed by using a calibration board. Currently, the camera self-calibration method is to perform camera calibration by using a distance between a vehicle and a lane line (that is, a calibration reference object) and a disappearance point, to obtain extrinsic parameters of the camera. For example, three-dimensional coordinates of the lane line relative to the camera are obtained through measurement, two-dimensional coordinates of the lane line on the image plane of the camera are obtained based on a photographed image of the lane line that is photographed by the camera, and then the extrinsic parameters of the camera are obtained through calculation based on the three-dimensional coordinates of the lane line relative to the camera and the two-dimensional coordinates of the lane line on the image plane of the camera.

However, a disadvantage of the camera self-calibration method is that a relatively large quantity of conditions are required. For example, the vehicle is required to travel in the center. This requirement is highly demanding, resulting in relatively low precision of the camera calibration. In addition, a current camera self-calibration method is only applicable to specific roads, for example, a horizontal road or a straight road, and has relatively low universality.

2. High-Precision Map

A high-precision map is one of the core technologies of unmanned driving, and is a high-precision electronic map. A map used for navigation and geographic information query in everyday life is a traditional map, which mainly serves human drivers. Different from the traditional map, the high-precision map mainly serves unmanned vehicles or machine drivers.

An important feature of the high-precision map is high precision. A traditional map can only have a precision in units of meters. For vehicles, the precision in units of meters is not enough. The high-precision map achieves centimeter-level precision, which is crucial to ensuring safety of unmanned driving.

The high-precision map is a vector map of road feature objects. The high-precision map includes geometric shapes and location information of the road feature objects. The road feature object includes, but is not limited to, a lane line, a sign plate (for example, a traffic sign or a pole-like plate), a pole-like object (for example, a street lamp pole), a road pavement marking, and a traffic light.

In other words, the high-precision map may provide accurate road geometry, and contour and location information of a road facility (a location in a world coordinate system, that is, an absolute coordinate location).

The high-precision map also includes geometric descriptions of various road feature objects. For example, high-precision location information of a geometric corner point of the road feature object may be queried on the high-precision map. For example, a current high-precision map in shapefile format supports range query and vector projection.

Currently, a form of the road feature object on the high-precision map is a binary image.

The high-precision map may have a function of projecting an image of the road feature object. For example, parameters (including intrinsic parameters and extrinsic parameters) of the camera and positioning information of the camera are provided, so that the high-precision map can output a road feature object projection image based on a geometric model of camera imaging.

It should be noted that the high-precision map in this embodiment of this disclosure is a high-precision electronic map in the field of unmanned driving technologies, instead of a conventional map.

As described above, calibration precision of extrinsic parameter of an existing dynamic camera calibration method is relatively low.

This disclosure provides a method and apparatus for calibrating an extrinsic parameter of a camera. Extrinsic parameters of a camera are obtained by using a high-precision map, so as to improve calibration precision of extrinsic parameter of a camera.

The following describes technical solutions of this disclosure with reference to accompanying drawings.

FIG. 1 is a flowchart of a method 100 for calibrating an extrinsic parameter of a camera according to an embodiment of this disclosure. The method 100 includes steps S110 and S120.

S110: Obtain a photographed image of a camera, where the photographed image is an image photographed by the camera by using a calibration reference object as a photographed object. In other words, the photographed image includes the calibration reference object.

It should be understood that the photographed image is an actual photographed image of the calibration reference object.

The calibration reference object may be an object around the camera. For example, the calibration reference object may be a road feature object. For example, the calibration reference object may be any one of the following road feature objects: a lane line, a sign plate, a pole-like object, a pavement marking, and a traffic light. The sign plate is, for example, a traffic sign or a pole-like sign, and the pole-like object is, for example, a street lamp pole.

The calibration reference object may also be referred to as a calibration object or a reference object.

S120: Obtain extrinsic parameters of the camera based on the photographed image and a high-precision map, where the high-precision map includes the calibration reference object.

The high-precision map includes the calibration reference object, which indicates that the high-precision map has location information of the calibration reference object.

As described above, the high-precision map is a vector map of the road feature object. The high-precision map includes a geometric shape and location information of the road feature object, that is, the high-precision map can provide accurate road geometry, and a contour and location information (an absolute coordinate location) of a road facility. Therefore, high-precision location information of a geometric corner point of the road feature object may be queried on the high-precision map.

It should be understood that, provided that the high-precision map includes the location information of the calibration reference object, the high-precision location information of the calibration reference object can be queried on the high-precision map.

The extrinsic parameters of the camera are obtained by using an actual photographed image of the calibration reference object and the high-precision map, so that in a process of obtaining the extrinsic parameters, an operation of measuring three-dimensional coordinates of the calibration reference object relative to the camera does not need to be performed.

As described above, in an existing dynamic camera calibration method, the three-dimensional coordinates of the calibration reference object relative to the camera are obtained through measurement. However, during movement of the camera, precision of measuring the three-dimensional coordinates of the calibration reference object relative to the camera is relatively low. As a result, calibration precision of extrinsic parameter of the camera is relatively low.

In this embodiment of this disclosure, the extrinsic parameters of the camera are obtained by using the photographed image of the calibration reference object and the high-precision map, and the operation of measuring three-dimensional coordinates of the calibration reference object relative to the camera does not need to be performed, so that the calibration precision of extrinsic parameter of the camera is no longer limited by measurement precision.

The camera in this embodiment of this disclosure may be in a static state, or may be in a moving state.

The method for calibrating an extrinsic parameter of a camera provided in this embodiment of this disclosure may be applicable to an in-vehicle camera system. For example, the camera in this embodiment of this disclosure is a vehicle-mounted camera, and a vehicle where the camera is located may be in a static state, or may be in a moving state.

It should be understood that this embodiment of this disclosure may be applied to static extrinsic parameter calibration of a camera, or may be applied to dynamic extrinsic parameter calibration of a camera.

In step S120, the implementation of obtaining the extrinsic parameters of the camera based on the photographed image and the high-precision map may include an implementation 1 and an implementation 2 that are described below.

Implementation 1:

As shown in FIG. 2, step S120 further includes step S121 to step S124.

S121: Obtain two-dimensional coordinates of the calibration reference object on the photographed image.

That is, the two-dimensional coordinates of the calibration reference object on an image plane of the camera are obtained. For a manner of obtaining the two-dimensional coordinates of the calibration reference object on the image plane of the camera, refer to the conventional technology, and details are not described in this embodiment of this disclosure.

S122: Determine a location of the camera on the high-precision map based on positioning information of the camera, and obtain a location of the calibration reference object on the high-precision map based on the location of the camera on the high-precision map.

For example, after the positioning information of the camera is obtained, the location of the camera may be located on the high-precision map based on the positioning information of the camera, and then the location of the calibration reference object on the high-precision map may be found based on the location of the camera on the high-precision map.

Obtaining the positioning information of the camera may be implemented by using any one or a combination of the following location technologies: a real-time kinematic (RTK) technology based on satellite location, and a matching location technology based on vision or a laser radar.

It should be understood that the positioning information of the camera may alternatively be obtained by using another feasible location technology.

For example, the positioning information of the camera is an absolute location of the camera (that is, coordinates of the camera in a world coordinate system).

Optionally, in step S122, the location of the calibration reference object on the high-precision map may be obtained by using the following step (1) and step (2).

Step (1): Determine, based on the location of the camera on the high-precision map and the photographed image of the camera obtained in step S110, a target road feature object on the high-precision map that is used as the calibration reference object.

Step (2): Determine a location of the target road feature object on the high-precision map as a location of the calibration reference object on the high-precision map.

Step (1) may further include the following sub-step (1) and sub-step (2).

Sub-step (1): Obtain a candidate target road feature object on the high-precision map based on the location of the camera on the high-precision map. For example, a road feature object that is on the high-precision map, and whose distance from the location of the camera on the high-precision map is less than a specific value, may be used as the candidate target road feature object.

Sub-step (2): Extract a geometric feature of the calibration reference object on the photographed image obtained in step S110, and compare a geometric feature of each road feature object in the candidate target road feature objects by using the geometric feature of the calibration reference object, so as to use one road feature object with the best comparison result (for example, one road feature object with the highest geometric feature matching degree) as the calibration reference object.

It should be understood that, in step (1), another feasible comparison method may be alternatively used. The target road feature used as the calibration reference object may be determined on the high-precision map by using an actual photographed image, photographed by the camera, of the calibration reference object.

The location of the calibration reference object on the high-precision map is obtained based on the location of the camera on the high-precision map and the photographed image of the camera obtained in step S110, so that accuracy of locating the calibration reference object on the high-precision map can be improved.

S123: Obtain three-dimensional coordinates of the calibration reference object relative to the camera based on the location of the calibration reference object on the high-precision map.

In step S123, the three-dimensional coordinates of the calibration reference object relative to the camera may be obtained in various manners by using the high-precision map.

Optionally, in an implementation, step S123 includes: obtaining an absolute location of the calibration reference object based on the location of the calibration reference object on the high-precision map; and obtaining the three-dimensional coordinates of the calibration reference object relative to the camera through calculation based on the absolute location of the calibration reference object and an absolute location of the camera.

The absolute location of the calibration reference object and the absolute location of the camera indicate the coordinates of the calibration reference object and the coordinates of the camera separately in the same coordinate system. For example, the absolute location of the calibration reference object is coordinates of the calibration reference object in the world coordinate system, and the absolute location of the camera is coordinates of the camera in the world coordinate system.

It should be understood that the absolute location of the camera may be obtained based on the positioning information of the camera. For example, the positioning information of the camera may be an absolute location of the camera. The absolute location of the calibration reference object may be obtained based on the location of the calibration reference object on the high-precision map.

Optionally, in another implementation, the high-precision map has a function of generating relative locations of two location points on the map. Step S123 includes: generating the three-dimensional coordinates of the calibration reference object relative to the camera by using the high-precision map based on the location of the camera on the high-precision map and the location of the calibration reference object on the high-precision map.

It should be understood that a location point of the camera on the high-precision map and a location point of the calibration reference object on the high-precision map are provided, so that the three-dimensional coordinates of the calibration reference object relative to the camera can be generated by using the high-precision map.

S124: Obtain extrinsic parameters of the camera through calculation based on the two-dimensional coordinates of the calibration reference object on the photographed image and the three-dimensional coordinates of the calibration reference object relative to the camera.

Refer to the above description of camera calibration. The extrinsic parameters of the camera may be obtained through calculation by using a geometric model for camera imaging based on the two-dimensional coordinates of the calibration reference object on an image plane of the camera and the three-dimensional coordinates of the calibration reference object relative to the camera. For an algorithm, refer to the conventional technology. No limitation is imposed, and details are not described in this disclosure.

In an existing dynamic camera calibration method, the three-dimensional coordinates of the calibration reference object relative to the camera are obtained through measurement. As a result, the calibration precision of extrinsic parameter of a camera depends on measurement precision of the three-dimensional coordinates.

In this embodiment of this disclosure, the three-dimensional coordinates of the calibration reference object relative to the camera are obtained by using the high-precision map, instead of being obtained through measurement, thereby avoiding that the calibration precision of extrinsic parameter of a camera is limited by measurement precision. In addition, because a high-precision attribute of the high-precision map can improve precision of the three-dimensional coordinates of the calibration reference object relative to the camera, thereby improving the calibration precision of extrinsic parameter of a camera.

Implementation 2:

In the implementation 2, the calibration reference object is a road feature object.

As shown in FIG. 3, step S120 further includes step S125 to step S128.

S125: Obtain a plurality of groups of camera parameters, where each group of camera parameters includes intrinsic parameters and extrinsic parameters.

For example, each group of camera parameters includes intrinsic parameters, distortion parameters, and extrinsic parameters of a camera. The extrinsic parameters include a translation matrix and a rotation matrix.

For example, by using current camera parameters as a reference, the plurality of groups of camera parameters are generated, by using a preset step, through simulation.

It should be understood that, during movement of the camera, the intrinsic parameters, the distortion parameters, and the translation matrix of the camera are not likely to change; or a change amplitude of the intrinsic parameters, the distortion parameters, and the translation matrix of the camera is relatively small. It may be assumed that these parameters remain unchanged at initial values, and the rotation matrix of the camera may change. Therefore, simulated values of a plurality of rotation matrices may be generated based on a current rotation matrix of the camera, so as to generate the plurality of groups of camera parameters.

Optionally, in an implementation, step S125 includes: generating, by using an initial value of a rotation matrix of the camera as a reference, a plurality of groups of rotation matrix simulated values by using a preset step; and generating the plurality of groups of camera parameters based on the plurality of groups of rotation matrix simulated values.

For example, a current rotation matrix of the camera is used as a reference, and the rotation matrix is changed in two opposite rotation directions (for example, left rotation and right rotation) based on a preset step, so as to generate the plurality of rotation matrix simulated values (for example, 8000 rotation matrix simulated values are generated). Then, the plurality of groups of camera parameters are generated based on the plurality of rotation matrix simulated values. In other words, rotation matrices of different groups in the plurality of groups of camera parameters are different, and other parameters (the intrinsic parameters, the distortion parameters, and the translation matrix) may be the same.

The preset step may be determined based on an application requirement. For example, the preset step is 0.2 degrees (0.2°).

A quantity of groups of the plurality of camera parameters may also be determined based on an application requirement.

Alternatively, in another implementation, step S125 includes: the obtaining a plurality of groups of camera parameters includes: generating, by using a rotation matrix and a translation matrix of the camera separately as a reference, a plurality of groups of rotation matrix simulated values and a plurality of groups of translation matrix simulated values by using a corresponding step; and generating the plurality of groups of camera parameters based on the plurality of groups of rotation matrix simulated values and the plurality of groups of translation matrix simulated values. In other words, the rotation matrices are different from the translation matrices in different groups of the plurality of camera parameters, and other parameters (intrinsic parameters and distortion parameters) may be the same.

It should be understood that, in an actual process of obtaining the plurality of groups of camera parameters, which types of parameters remain unchanged and which types of parameters change may be determined based on an application requirement.

S126: Generate a plurality of road feature projection images by using the high-precision map based on the plurality of groups of camera parameters and positioning information of the camera.

For example, the location of the camera on the high-precision map is first determined based on the positioning information of the camera; and then projection is performed on the high-precision map based on the location of the camera on the high-precision map, the plurality of groups of camera parameters obtained in step S125, and the geometric model of camera imaging, so as to generate a plurality of road feature projection images separately corresponding to the plurality of groups of camera parameters.

In other words, the location of the camera on the high-precision map is queried based on the positioning information of the camera. Then, the projection is performed on the high-precision map based on the intrinsic parameters, the distortion parameters, and the extrinsic parameters of the camera, to form a road feature object projection image (binary image) of a geometric model corresponding to the camera imaging. For example, the plurality of road feature projection images are shown in FIG. 4.

S127: Obtain, from the plurality of road feature projection images, a matched road feature projection image that has a highest degree of matching with the photographed image.

Figure 4:
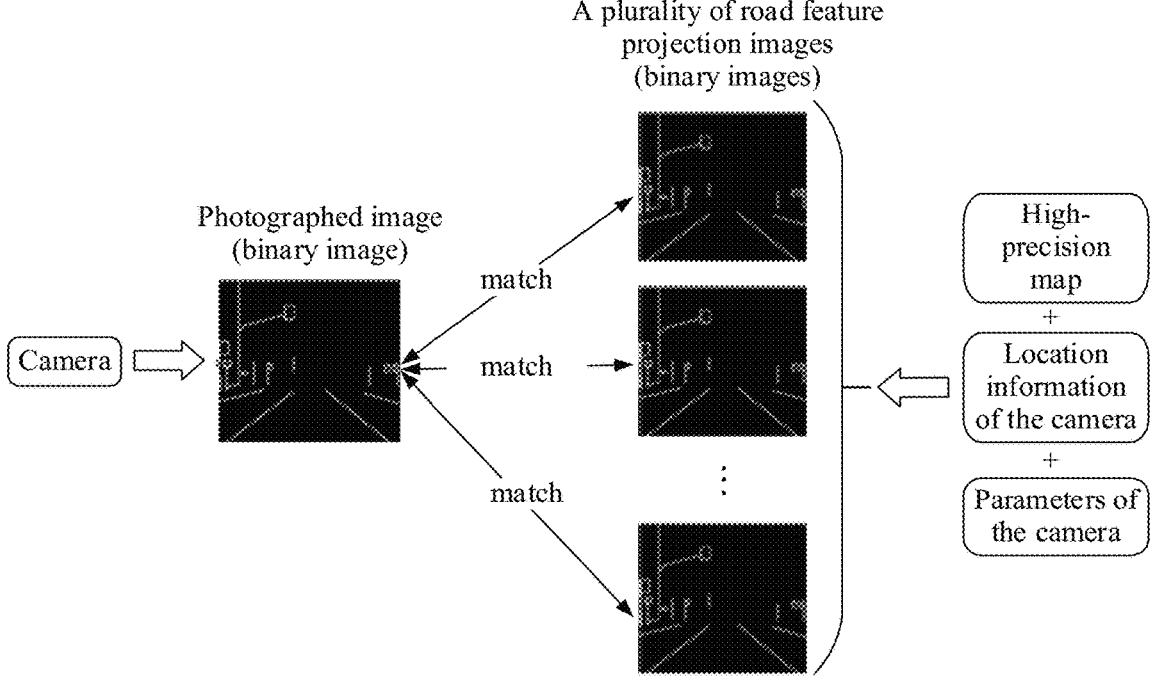
FIG. 4 is a diagram of a plurality of road feature projection images being matched by using a photographed image according to an embodiment of this disclosure.

For example, as shown in FIG. 4, matching is performed on each of the plurality of road feature projection images by using an actual photographed image of the calibration reference object.

A method for matching the photographed image with the road feature projection image may be calculating an average pixel deviation between the two images.

For example, the average pixel deviation between the photographed image and each of the plurality of road feature projection images is separately calculated. Finally, the road feature projection image with the minimum average pixel deviation is used as the matched road feature projection image.

Alternatively, another feasible method may be used to perform the image matching operation.

It should be further understood that another feasible image matching method may also be used to match the photographed image of the camera with the plurality of road feature projection images generated on the high-precision map.

Optionally, in some embodiments, step S127 includes: processing the photographed image of the camera obtained in step S110 into an image in a first form, where the first form is a form of the road feature projection image that is supported by the high-precision map; and obtaining, from the plurality of road feature projection images, a matched road feature projection image that has a highest degree of matching with the image of the photographed image in the first form.

For example, in the conventional technology, the road feature projection image usually supported by the high-precision map is a binary image. In this scenario, the image in the first form mentioned in this embodiment is a binary image.

Optionally, in an implementation, step S127 includes: obtaining a binary image of the photographed image of the camera; and obtaining, from the plurality of road feature projection images, a matched road feature projection image that has a highest degree of matching with the binary image of the photographed image.

Figure 5:
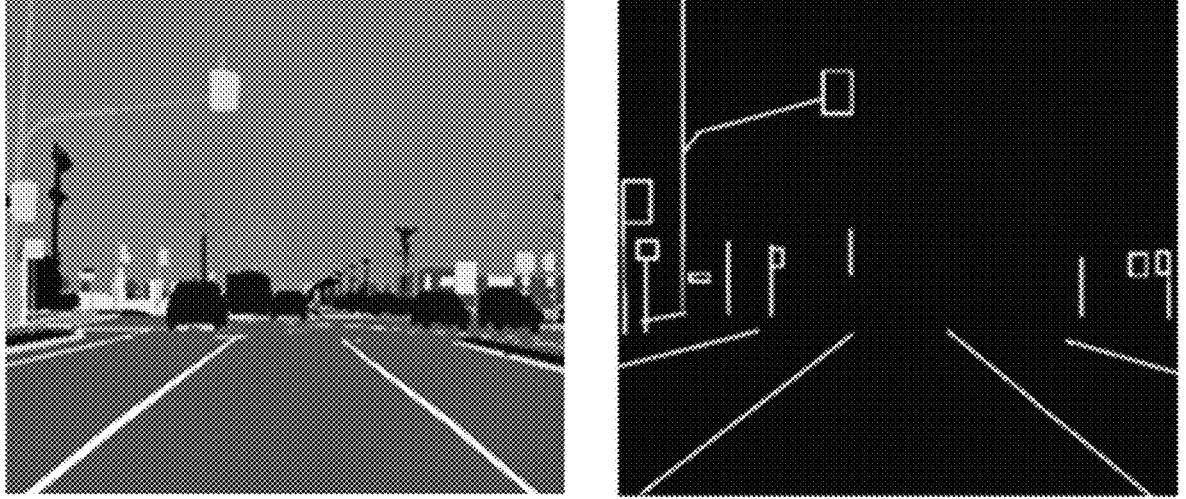
FIG. 5 is a diagram of a photographed image and a binary image of the photographed image according to an embodiment of this disclosure.

For example, a method for obtaining the binary image of the photographed image includes two steps. In a first step, pixel-level semantic segmentation is performed on the photographed image by using a neural network (NN) inference model, to identify and extract the road feature object (a lane line, a sign plate, a street lamp pole, and the like). In a second step, a contour of the road feature object is extracted from the segmented image, to generate a binary image. For example, the photographed image and the binary image extracted from the photographed image are separately shown in the left image and the right image in FIG. 5.

It should be understood that the photographed image, photographed by the camera, of the calibration reference object is processed into a binary image, so that a form of the photographed image is consistent with the form of the road feature object on the high-precision map. If the form of the photographed image is consistent with the form of the plurality of road feature projection images, this helps improve accuracy of image matching, so as to implement high calibration precision of extrinsic parameter.

It should be noted that, with evolution of technologies, if the high-precision map may support a road feature projection image in another form, in step S126, the matching may be performed after the actual photographed image of the camera is processed into an image in another form.

S128: Obtain the extrinsic parameters of the camera based on one group of camera parameters corresponding to the matched road feature projection image.

For example, each group of camera parameters includes intrinsic parameters, distortion parameters, a translation matrix, and a rotation matrix. In this case, the translation matrix and the rotation matrix of the camera may be obtained from one group of camera parameters corresponding to the matched road feature projection image, that is, to-be-calibrated extrinsic parameter of a cameras are obtained.

It should be understood that, if the dynamic camera calibration is intended to calibrate only the rotation matrix of the camera, the rotation matrix of the camera may be obtained only from one group of camera parameters corresponding to the matched road feature projection image, that is, the to-be-calibrated extrinsic parameter of a cameras are obtained.

In this embodiment, the extrinsic parameters of the camera are obtained by using a road feature object projection function of the high-precision map, instead of being obtained by measuring the three-dimensional coordinates of the calibration reference object relative to the camera, thereby avoiding that the calibration precision of extrinsic parameter of a camera is limited by measurement precision. In addition, due to a high-precision attribute of the high-precision map, high calibration precision of extrinsic parameter of a camera can be implemented.

In the conventional technology, the high-precision map is used in the following manner: based on the calibrated camera parameters, a projection image of the road feature object is generated by using the high-precision map, so as to guide an unmanned vehicle to travel safely.

In this embodiment of this disclosure, a road feature object projection function of the high-precision map is reversely applied, thereby cleverly improving precision of the extrinsic parameter calibration of a camera.

It should be noted that, in addition to the implementation 1 and the implementation 2 described above, all solutions of obtaining the extrinsic parameters of the camera by using the high-precision map fall within the protection scope of this disclosure.

This embodiment of this disclosure may be applicable to dynamic camera calibration, or may be applicable to static camera calibration.

For example, the camera in this embodiment of this disclosure is a vehicle-mounted camera, and a vehicle on which the camera is carried is in a moving state.

Based on the description above, it can be learned that in the camera calibration solution provided in this disclosure, the extrinsic parameter of a cameras are calibrated by using the high-precision map, so that the calibration precision of extrinsic parameter of a camera can be improved.

In the camera calibration solution provided in this disclosure, the calibration reference object may be any type of road feature objects, and is not strictly limited to a lane line (in an existing camera self-calibration method, the calibration reference object is limited to a lane line). For example, the calibration reference object in the camera calibration solution provided in this disclosure may be any one of the following lane feature objects: a lane line, a sign plate, a pole-like object, a pavement marking, and a traffic light. The sign plate is, for example, a traffic sign or a pole-like sign, and the pole-like object is, for example, a street lamp pole.

In addition, the camera calibration solution provided in this disclosure may be applicable to both the dynamic camera calibration and the static camera calibration. In addition, in the camera calibration solution provided in this disclosure, in a scenario of the dynamic camera calibration, there is no limitation on a specific road, and the vehicle does not need to travel in the center. Therefore, the camera calibration solution provided in this disclosure has good universality.

It should be understood that the camera calibration solution provided in this disclosure may be applied to a step of camera parameter calibration when a self-driving vehicle is assembled and comes off an assembly line. This is not limited to a specific calibration workshop. In addition, all cameras may be calibrated at the same time, thereby reducing calibration time.

It should be further understood that the camera calibration solution provided in this disclosure may also be applied to a scenario in which, during a use process after a vehicle leaves a factory, the extrinsic parameter changes and real-time online correction or periodic calibration are required.

It should be further understood that the camera calibration solution provided in this disclosure can greatly reduce dependency on a calibration workshop, and implement high-precision calibration of extrinsic parameters of a vehicle-mounted camera anytime and anywhere (that is, online and in real time).

It should be further understood that the camera calibration solution provided in this disclosure may be also applied to a calibration field of another sensor (for example, a laser radar). For example, when a parameter of another sensor (for example, a laser radar) is calibrated, the location information of the calibration reference object may also be obtained by using the high-precision map.

Embodiments described in this specification may be independent solutions, or may be combined based on internal logic. All these solutions fall within the protection scope of this disclosure.

The foregoing describes method embodiments provided in this disclosure, and the following describes apparatus embodiments provided in this disclosure. It should be understood that the descriptions of apparatus embodiments are corresponding to the descriptions of the method embodiments. Therefore, for content that is not described in detail, refer to the foregoing method embodiments. For brevity, details are not described herein again.

Figure 6:
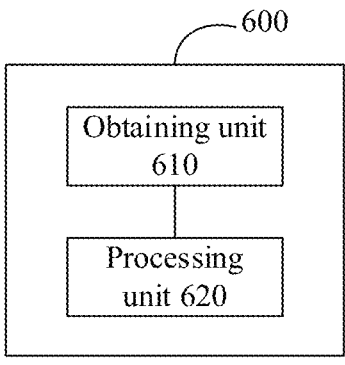
FIG. 6 is a block diagram of an apparatus for calibrating an extrinsic parameter of a camera according to an embodiment of this disclosure.

FIG. 6 shows an apparatus 600 for calibrating an extrinsic parameter of a camera according to an embodiment of this disclosure. The apparatus 600 includes an obtaining unit 610 and a processing unit 620.

The obtaining unit 610 is configured to obtain a photographed image of a camera, where the photographed image is an image photographed by the camera by using a calibration reference object as a photographed object.

The processing unit 620 is configured to obtain extrinsic parameters of the camera based on the photographed image and a high-precision map, where the high-precision map includes the calibration reference object.

Optionally, in an embodiment, the processing unit 620 is configured to obtain the extrinsic parameters of the camera by performing the following operations: obtaining two-dimensional coordinates of the calibration reference object on the photographed image; determining a location of the camera on the high-precision map based on positioning information of the camera, and obtaining a location of the calibration reference object on the high-precision map based on the location of the camera on the high-precision map; obtaining three-dimensional coordinates of the calibration reference object relative to the camera based on the location of the calibration reference object on the high-precision map; and obtaining the extrinsic parameters of the camera through calculation based on the two-dimensional coordinates and the three-dimensional coordinates.

Optionally, in an implementation, the processing unit 620 obtains the three-dimensional coordinates of the calibration reference object relative to the camera by performing the following operations: obtaining an absolute location of the calibration reference object based on the location of the calibration reference object on the high-precision map; and obtaining the three-dimensional coordinates of the calibration reference object relative to the camera through calculation based on the absolute location of the calibration reference object and the absolute location of the camera.

Optionally, in another implementation, the high-precision map has a function of generating relative locations of two location points on the map. The processing unit 620 obtains the three-dimensional coordinates of the calibration reference object relative to the camera by performing the following operation: generating the three-dimensional coordinates of the calibration reference object relative to the camera by using the high-precision map based on the location of the camera on the high-precision map and the location of the calibration reference object on the high-precision map.

Optionally, in another embodiment, the calibration reference object is a road feature object. The processing unit 620 is configured to obtain the extrinsic parameters of the camera by performing the following operations: obtaining a plurality of groups of camera parameters, where each group of camera parameters includes intrinsic parameters and extrinsic parameters; generating a plurality of road feature projection images by using the high-precision map based on the plurality of groups of camera parameters and positioning information of the camera; obtaining, from the plurality of road feature projection images, a matched road feature projection image that has a highest degree of matching with the photographed image; and obtaining the extrinsic parameters of the camera based on one group of camera parameters corresponding to the matched road feature projection image.

Optionally, in an implementation, the processing unit 620 is configured to obtain the plurality of groups of camera parameters by performing the following operations: generating, by using an initial value of a rotation matrix of the camera as a reference, a plurality of groups of rotation matrix simulated values by using a preset step; and generating the plurality of groups of camera parameters based on the plurality of groups of rotation matrix simulated values.

Optionally, in another implementation, the processing unit 620 is configured to obtain the plurality of groups of camera parameters by performing the following operations: generating, by using a rotation matrix and a translation matrix of the camera separately as a reference, a plurality of groups of rotation matrix simulated values and a plurality of groups of translation matrix simulated values by using a corresponding step; and generating the plurality of groups of camera parameters based on the plurality of groups of rotation matrix simulated values and the plurality of groups of translation matrix simulated values.

Optionally, in some implementations, if the form of the road feature object on the high-precision map is a binary image, the processing unit 620 is configured to obtain the matched road feature projection image by performing the following operations: obtaining a binary image of the photographed image; and obtaining, from the plurality of road feature projection images, a matched road feature projection image that has a highest degree of matching with the binary image of the photographed image.

Optionally, the camera is a vehicle-mounted camera, and a vehicle on which the camera is carried may be in a static state, or may be in a moving state.

Figure 7:
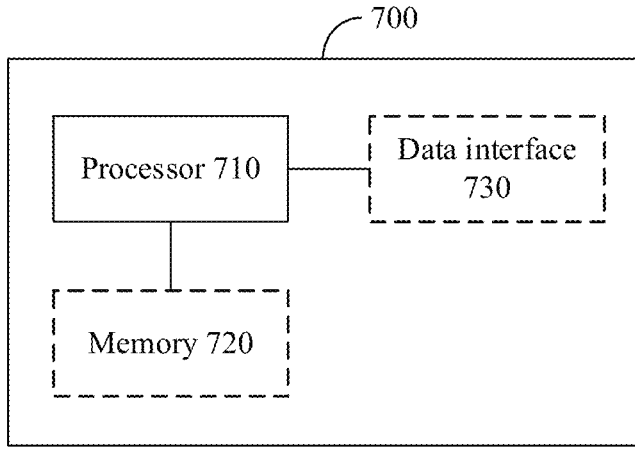
FIG. 7 is another block diagram of an apparatus for calibrating an extrinsic parameter of a camera according to an embodiment of this disclosure.

As shown in FIG. 7, an embodiment of this disclosure further provides an apparatus 700 for calibrating an extrinsic parameter of a camera. The apparatus 700 includes a processor 710. The processor 710 is coupled to the memory 720. The memory 720 is configured to store a computer program or instructions. The processor 710 is configured to execute the computer program or the instructions stored in the memory 720, so that the method 100 in the foregoing method embodiments is performed.

Optionally, as shown in FIG. 7, the apparatus 700 may further include the memory 720.

Optionally, as shown in FIG. 7, the apparatus 700 may further include a data interface 730. The data interface 730 is configured to transmit data to the outside.

An embodiment of this disclosure further provides a computer-readable medium. The computer-readable medium stores program code to be executed by a device, and the program code is used to perform the method in the foregoing embodiment.

An embodiment of this disclosure further provides a computer program product including instructions. When the computer program product runs on a computer, the computer is enabled to perform the method in the foregoing embodiment.

An embodiment of this disclosure further provides a chip. The chip includes a processor and a data interface. The processor reads, by using the data interface, instructions stored in a memory, to perform the method in the foregoing embodiment.

Optionally, in an implementation, the chip may further include a memory, the memory stores instructions, the processor is configured to execute the instructions stored in the memory, and when the instructions are executed, the processor is configured to perform the method in the foregoing embodiment.

Unless otherwise defined, all technical and scientific terms used in this specification have the same meanings as those usually understood by a person skilled in the art of this disclosure. The terms used in this specification of this disclosure are merely for the purpose of describing embodiments, and are not intended to limit this disclosure.

A person of ordinary skill in the art may be aware that, with reference to the examples described in embodiments disclosed in this specification, the units and algorithm steps may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In several embodiments provided in this disclosure, it should be understood that the disclosed system, apparatus, and method may be implemented in another manner. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units, and may be in electrical, mechanical, or other forms.

The units described as separate parts may or may not be physically separate. Components displayed as units may or may not be physical units, that is, they may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this disclosure essentially or the part contributing to the conventional technology, or some of the technical solutions may be embodied in the form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for calibrating extrinsic parameters of a camera, comprising:

obtaining a photographed image photographed by the camera, the photographed image being photographed using a calibration reference object as a photographed object; and obtaining the extrinsic parameters of the camera based on the photographed image and a high-precision map, the high-precision map comprising the calibration reference object;

wherein the obtaining the extrinsic parameters of the camera based on the photographed image and the high-precision map comprises:

obtaining two-dimensional coordinates of the calibration reference object on the photographed image;

determining a location of the camera on the high-precision map based on positioning information of the camera and obtaining a location of the calibration reference object on the high-precision map based on the location of the camera on the high-precision map and based on:

obtaining candidate target road feature objects on the high-precision map based on the location of the camera on the high-precision map;

extracting a geometric feature of each of the calibration reference object on the photographed image; and comparing a geometric feature of each road feature object in the candidate target road feature objects using the geometric feature of the calibration reference object to select the calibration reference object using a result of the comparing, wherein a location of a corresponding candidate target road feature object on the high-precision map is used as the location of the calibration reference object on the high-precision map;

obtaining three-dimensional coordinates of the calibration reference object relative to the camera based on the location of the calibration reference object on the high-precision map, wherein the high-precision map has a function of generating relative locations of two location points on the high-precision map, and wherein the obtaining the three-dimensional coordinates of the calibration reference object relative to the camera based on the location of the calibration reference object on the high-precision map includes generating the three-dimensional coordinates of the calibration reference object relative to the camera by using the high-precision map based on the location of the camera on the high-precision map and the location of the calibration reference object on the high-precision map; and obtaining the extrinsic parameters of the camera through calculation based on the two-dimensional coordinates and the three-dimensional coordinates.

2. A method for calibrating extrinsic parameters of a camera, comprising:

obtaining a photographed image photographed by the camera, the photographed image being photographed using a calibration reference object as a photographed object, wherein the calibration reference object is a road feature object;

obtaining the extrinsic parameters of the camera based on the photographed image and a high-precision map, the high-precision map comprising the calibration reference object, and wherein the obtaining the extrinsic parameters of the camera based on the photographed image and the high-precision map comprises:

obtaining a plurality of groups of camera parameters, wherein each group of camera parameters comprises intrinsic parameters, distortion parameters, and extrinsic parameters;

generating a plurality of road feature projection images using the high-precision map based on the plurality of groups of camera parameters and the positioning information of the camera;

obtaining, from the plurality of road feature projection images, a matched road feature projection image that has a highest degree of matching with the photographed image; and obtaining the extrinsic parameters of the camera based on one group of camera parameters corresponding to the matched road feature projection image.

3. The method according to claim 2, wherein the obtaining the plurality of groups of camera parameters comprises:

generating, using an initial value of a rotation matrix of the camera as a reference, a plurality of groups of rotation matrix simulated values using a preset step; and generating the plurality of groups of camera parameters based on the plurality of groups of rotation matrix simulated values.

4. The method according to claim 2, wherein the road feature object on the high-precision map is a binary image, and the obtaining, from the plurality of road feature projection images, the matched road feature projection image that has the highest degree of matching with the photographed image comprises:

obtaining a binary image of the photographed image; and obtaining, from the plurality of road feature projection images, the matched road feature projection image that has the highest degree of matching with the binary image of the photographed image.

5. The method according to claim 1, wherein the camera is a vehicle-mounted camera, and a vehicle on which the camera is carried is in a moving state.

6. An apparatus for calibrating extrinsic parameters of a camera, comprising:

a memory storing instructions; and at least one processor in communication with the memory, the at least one processor configured, upon execution of the instructions, to perform the following steps:

obtaining a photographed image photographed by the camera, the photographed image being photographed using a calibration reference object as a photographed object; and obtaining the extrinsic parameters of the camera based on the photographed image and a high-precision map, the high-precision map comprising the calibration reference object, wherein the obtaining the extrinsic parameters of the camera based on the photographed image and the high-precision map comprises:

obtaining two-dimensional coordinates of the calibration reference object on the photographed image;

determining a location of the camera on the high-precision map based on positioning information of the camera and obtaining a location of the calibration reference object on the high-precision map based on the location of the camera on the high-precision map and based on:

obtaining candidate target road feature objects on the high-precision map based on the location of the camera on the high-precision map;

extracting a geometric feature of the calibration reference object on the photographed image; and comparing a geometric feature of each road feature object in the candidate target road feature objects using the geometric feature of the calibration reference object to select the calibration reference object using a result of the comparing, wherein a location of a corresponding candidate target road feature object on the high-precision map is used as the location of the calibration reference object on the high-precision map;

obtaining three-dimensional coordinates of the calibration reference object relative to the camera based on the location of the calibration reference object on the high-precision map, wherein the high-precision map has a function of generating relative locations of two location points on the high-precision map, and wherein the obtaining the three-dimensional coordinates of the calibration reference object relative to the camera based on the location of the calibration reference object on the high-precision map includes generating the three-dimensional coordinates of the calibration reference object relative to the camera by using the high-precision map based on the location of the camera on the high-precision map and the location of the calibration reference object on the high-precision map; and obtaining the extrinsic parameters of the camera through calculation based on the two-dimensional coordinates and the three-dimensional coordinates.

7. The apparatus according to claim 6, wherein the camera is a vehicle-mounted camera, and a vehicle on which the camera is carried is in a moving state.

8. A vehicle, comprising:

a camera; and an apparatus for calibrating extrinsic parameters of the camera according to the method of claim 1.

9. The vehicle according to claim 8, wherein the vehicle is in a moving state.

10. The method according to claim 2, wherein the obtaining the plurality of groups of camera parameters comprises:

generating, using a rotation matrix and a translation matrix of the camera, separately, as a reference, a plurality of groups of rotation matrix simulated values and a plurality of groups of translation matrix simulated values using a preset step; and generating the plurality of groups of camera parameters based on the plurality of groups of rotation matrix simulated values and the plurality of groups of translation matrix simulated values.

11. The method according to claim 1, wherein the positioning information of the camera is obtained by utilizing a real-time kinematic (RTK) technology based on satellite location, or a matching location technology based on vision radar or a laser radar.

12. The method according to claim 2, wherein matching the road feature projection image with the photographed image includes calculating an average pixel deviation between the road feature projection image and the photographed image.

\* \* \* \* \*